C. C. STEEL AND T. H. LYNN.
TIRE CARRIER FOR AUTOMOBILES.
APPLICATION FILED AUG. 25, 1919.
1,347,561. Patented July 27, 1920.
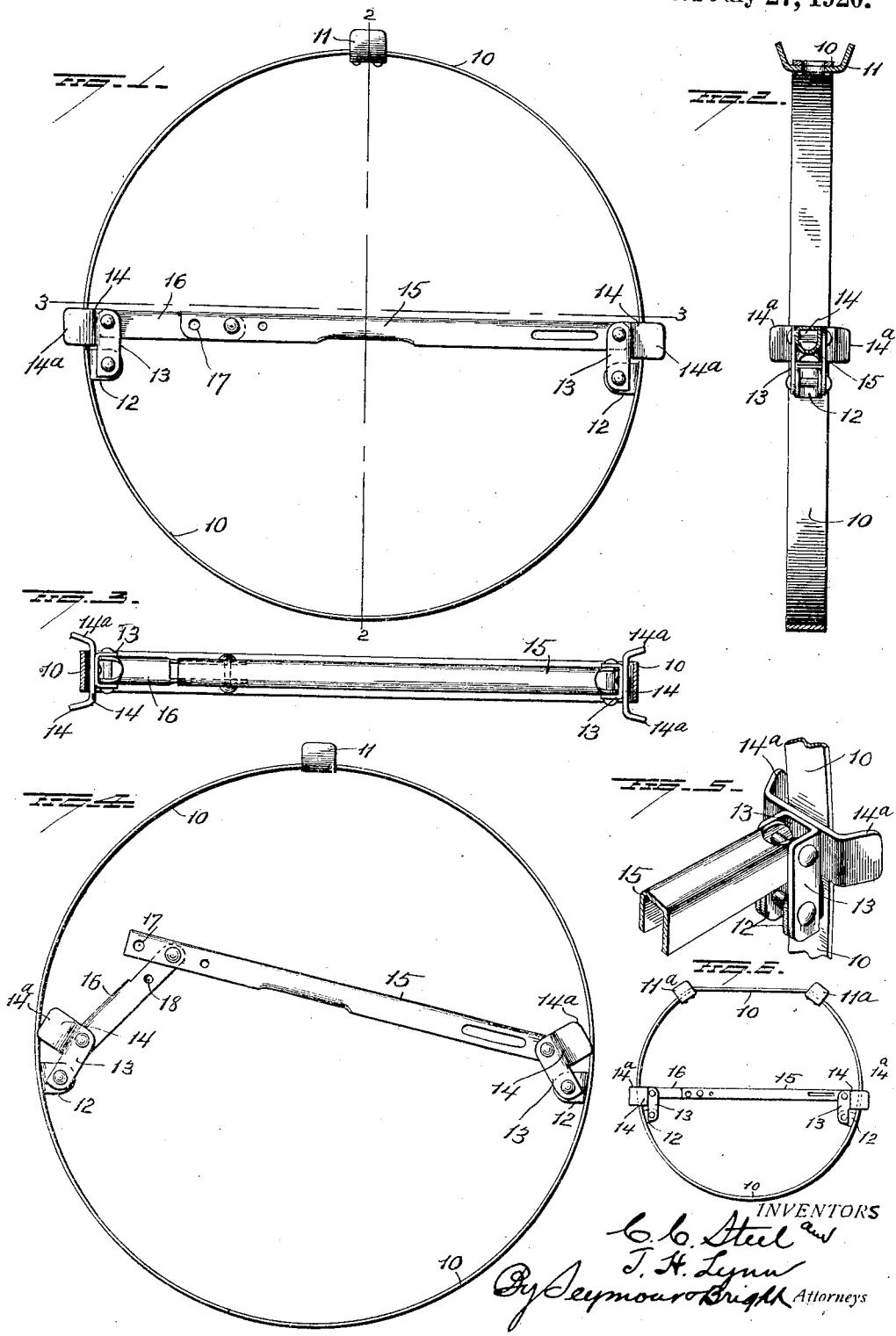

UNITED STATES PATENT OFFICE.

CHARLES C. STEEL AND THOMAS H. LYNN, OF WILLIAMSPORT, PENNSYLVANIA.

TIRE-CARRIER FOR AUTOMOBILES.

1,347,561. Specification of Letters Patent. Patented July 27, 1920.

Application filed August 25, 1919. Serial No. 319,601.

*To all whom it may concern:*

Be it known that we, CHARLES C. STEEL and THOMAS H. LYNN, citizens of the United States, and residents of Williamsport, in the county of Lycoming and State of Pennsylvania, have invented certain new and useful Improvements in Tire-Carriers for Automobiles, and do hereby declare the following to be a full, clear, and exact description of the invention, such as will enable others skilled in the art to which it appertains to make and use the same.

Our invention relates to an improvement in tire carriers for automobiles, the object being to simplify and cheapen the construction disclosed in our application Serial Number 281,206 filed March 7, 1919.

In the construction shown in our co-pending application a ring carrier is provided with fixed lugs, and lugs are carried on movable links which coöperate with said fixed lugs. In this improvement we have dispensed with the fixed lugs and brackets carrying the same, and the brace connecting the brackets, and provided the movable links with saddles each having two lugs adapted to project at opposite sides of the ring carrier and engage the opposite sides of the wheel rim for locking the latter on the carrier.

In the accompanying drawings Figure 1 is a view in elevation of our improvement; Fig. 2 is a vertical sectional view on the line 2—2 of Fig. 1; Fig. 3 is a horizontal sectional view on the line 3—3 of Fig. 1; Fig. 4 is a view showing the rim locking means in open position; Fig. 5 is an enlarged view of one of the links and its saddle and part of the toggle lever and Fig. 6 is a view of a modification.

10 represents a ring or hoop made of metal and of a size to snugly fit within a standard size wheel rim and form a support for the latter. This ring should be no wider than the rim, and is preferably of less width so that the latter will, when on the ring, be directly engaged by the lugs on the movable saddles, and be held firmly from any movement and against removal, except by the withdrawal of the lugs out of the plane of the rim. This ring is designed to be secured by any means to an automobile preferably at the rear thereof.

Secured to the inner face of the ring 10 at the top thereof is the fixed saddle 11, the upturned ends of which project beyond the ring and are adapted to engage the opposite sides of a rim and support the latter at the top. Secured to the inner face of the ring and at diametrically opposite points adjacent to but preferably slightly below its horizontal center, are the brackets 12 one at each side of the ring. These brackets are each made from a sheet metal strip bent into U shape and riveted at its closed side or end to the inner face of the ring, and pivoted to each bracket 12 is a link 13, each of the latter being made from a sheet metal plate bent into the form of a U, a portion of the plate between the side members at one end being cut away so as to permit the bracket 12 to be entered between the side members of the links. The side members of each link are as above stated pivoted to a bracket 12, and each link is provided at its free end with a saddle 14 the ends of which are bent outwardly and inclined to form outwardly diverging holding lugs 14$^a$ at the front and rear edges of the ring. Each saddle 14 is arranged with its long axis at right angles to the long axis of its link 13, and transversely to the ring 10 so that the lugs 14$^a$ at the two ends of the saddle will be at the opposite side edges of the ring 10 and when in rim locking or holding position, will project outwardly beyond the ring and engage the opposite side edges of the rim.

One of the links 13 is pivotally connected at its free end immediately at the rear of its saddle 14, to the lever 15, and the other link 13 is pivotally connected at its free end to the lever 16. The lever 16 is shorter than the lever 15 and the two levers are pivotally connected at their adjacent ends to form a toggle lever for actuating the two movable saddles. The inner end of the lever 15 projects beyond the pivot connecting it with the lever 16 and is provided with a hole 17 adapted when the two levers are straightened out or in locking position, to aline with a hole 18 in the shorter lever 15 for the passage of the hasp of a lock or other locking device. The levers 15 and 16 are also made of sheet metal bent into U-shape, and the longer lever 15 is rounded adjacent its pivotal connection with lever 16 to form a hand hold which is grasped to bend or straighten the toggle lever.

When the toggle lever is bent or broken at its joint, the free ends of the two links 13 will be pulled inwardly toward the center of the ring 10 thus retracting the lugs 14$^a$ on the saddles 14 and moving them within the outer plane of the ring thus leaving the latter unobstructed for the placement thereon of a rim.

In placing a rim on the carrier, the rim is first seated on the fixed saddle 11 with the tire valve (if a tire be on the rim) passing through a hole provided therefor in the ring. After the rim has been seated on the saddle 11, the depending part of the rim should be pushed back onto the ring, and then by applying pressure to member 15 of the toggle lever in a direction to straighten or bring the two members thereof into alinement, the saddles 14 will be forced outwardly thus carrying the lugs 14ª outwardly beyond the plane of the outer face of the ring 10 and against the opposite side edges of the rim. If the rim has not been properly centered on the ring, the inclined lugs 14ª will move it forwardly or rearwardly as the case may be, and center it and hold it against the possibility of accidental displacement.

When the rim is thus locked on the carrier the toggle lever acts as a brace for the carrier and prevents any collapsing or sagging due to the weight of the rim and vibration of the parts.

By breaking the joint of the toggle lever and moving the parts thereof to unlocking position, the two links 13 with their attached saddles 14 will be drawn inwardly thus removing the lugs 14ª from the plane of outer surface of the ring so as to permit a rim to be removed or placed on the ring. As before explained each ring is adapted to receive a standard rim and after the latter has been placed in position and the lever locked, it will be held against the possibility of accidental loss or displacement and cannot be removed except by the release of the locking means at the free ends of the two members of the toggle lever.

In the modification shown in Fig. 6, the ring is flattened at the top and a fixed saddle 11ª is provided at the two ends of the flattened portion of the carrier. With this construction the extreme upper portion of the rim and tire valve would rest clear of the carrier.

It is evident that many slight changes might be resorted to in the relative arrangement of parts shown and described without departing from the spirit and scope of our invention. Hence we would have it understood that we do not wish to confine ourselves to the exact construction and arrangement of parts shown and described, but Having fully described our invention what we claim as new and desire to secure by Letters-Patent, is:—

1. In a spare rim carrier, the combination of a curved support, fixed lugs at the upper part thereof for engaging the rim, two links oppositely disposed, and each pivoted at one end to the inner surface of said curved support, a saddle secured to each link at the free end of the latter and straddling the support, each saddle adapted to engage the sides of a rim seated on the support and a toggle lever for moving the two links into and out of rim locking position.

2. In a spare rim carrier, the combination of a ring shaped support, fixed lugs at the upper part thereof arranged to engage the opposite side edges of a rim, two oppositely disposed links pivoted to the inner face of the support, a saddle on each link, the said saddles straddling the support and each having lugs at its ends, the said lugs adapted to be projected outwardly beyond the plane of the support at the two side edges thereof, and a toggle lever connecting the two links.

3. In a spare rim carrier, the combination of a ring shaped support, fixed lugs at the upper part thereof arranged to engage the opposite side edges of a wheel rim, two oppositely disposed links pivoted to the inner face of the support, a saddle on each link and an inclined lug at each end of each saddle, the said lugs adapted to be projected outwardly beyond the plane of the support at the front and rear thereof and a toggle lever connecting the links for actuating them.

In testimony whereof we have signed this specification.

CHARLES C. STEEL.
THOMAS H. LYNN.